United States Patent [19]

Tobias

[11] Patent Number: 5,083,756
[45] Date of Patent: Jan. 28, 1992

[54] LOAD SUPPORT VIBRATION ISOLATION MOUNT

[76] Inventor: Jaromir Tobias, 322 E. 57th St., New York, N.Y. 10022

[21] Appl. No.: 556,457

[22] Filed: Jul. 24, 1990

[51] Int. Cl.⁵ .................................................. F16F 9/06
[52] U.S. Cl. .................................... 267/136; 267/64.11; 267/64.15; 267/64.26; 248/550; 248/562
[58] Field of Search ................... 267/136, 118, 64.15, 267/64.11, 64.27, 35, 119, 121, 124, 141.1, 140.1 R; 188/269, 314, 311, 321.11, 322.15, 322.22; 248/550

[56] References Cited

U.S. PATENT DOCUMENTS

| | | | |
|---|---|---|---|
| 880,257 | 2/1908 | Welch | 188/267 |
| 2,882,592 | 4/1959 | Bouvciev De Carbon | 188/269 |
| 3,365,191 | 1/1968 | Ellis, Jr.et al. | 188/322.22 |
| 3,806,105 | 4/1974 | Knoishi et al. | 267/35 |
| 3,945,663 | 3/1976 | Duckett | 188/322.21 |
| 4,352,487 | 10/1982 | Shtarkman | 267/35 |
| 4,688,776 | 8/1987 | LeCour et al. | 267/140.1 |
| 4,721,292 | 1/1988 | Saito | 267/140.1 |

FOREIGN PATENT DOCUMENTS 1059321  12/1983  U.S.S.R. .............................. 267/136

Primary Examiner—Robert J. Oberleitner
Assistant Examiner—Chris Schwartz
Attorney, Agent, or Firm—Antonelli, Terry, Stout & Kraus

[57] ABSTRACT

A load support vibration isolation mount comprises first and second parts movable relative to one another with a gas cushion and a high pressure hydraulic fluid disposed in series between the parts to attenuate vibration induced force transfer between the parts. At least one porous elastic member and at least one sieve-like plate are arranged in stacked relation within the high pressure hydraulic fluid of the mount for absorbing energy from dynamic loading of the mount. Enhanced energy absorption and broader response characteristics for absorbing energy from dynamic loading of different frequencies are attained.

15 Claims, 2 Drawing Sheets 5,083,756

LOAD SUPPORT VIBRATION ISOLATION MOUNT

TECHNICAL FIELD

The present invention relates to a load support vibration isolation mount of the type having a high pressure fluid medium means and a spring cushion means disposed in series between relatively movable parts of the mount to attenuate vibration induced force transfer between the mount parts.

BACKGROUND ART

One type of prior art load support vibration isolation mount which is used for vehicle engine mounts, for example, comprises elastically deformable hard rubber cushions or the like for cushioning the transfer of vibrations as between the engine and the vehicle frame. In the application of the mount to a vehicle, such solid elastically deformable engine mounts do help isolate the vehicle body frame carrying the engine from engine induced mechanical vibration and the engine from vehicle induced vibrations. However, such mounts suffer from disadvantages in that they are unable to attenuate the wide range of mechanical vibrations experienced in use on an automobile. For example, an automobile is designed to operate under many speed, torque, acceleration and deceleration conditions, all of which create different mechanical vibration force, frequency and amplitude patterns. The above-mentioned conventional shock absorber type engine mounts are preset and passive in that they only passively react to vibration forces based on their preset elastic design characteristics. Such vibration isolation mounts can be designed to operate quite well over certain narrow mechanical vibration patterns. However, because of their design they are not effective to attenuate vibrations over all operating ranges of the engine and vehicle.

Certain other prior art mounts, such as vehicle engine mounts, utilize a closed fluid shock absorber system for cushioning the transfer of vibrations between the engine and vehicle frame. Since these fluid shock absorber mounts are closed systems, the mounts act much like the elastically deformable spring or hard rubber cushion mounts discussed above. Further, in cases of large relative movement between the parts being supported, the shock attenuation substantially diminishes as the fluid pressure rises. Although certain shock absorber mounts provide for multiple fluid chambers and different flow paths depending upon the relative displacement of the parts being supported, such systems are very complex and costly to construct and are also ultimately limited by the total volume and fluid accommodating space in the overall closed system at an individual shock absorber mount.

The above-mentioned prior art mounts thus permit an unacceptable level of transfer of vibration forces between the engine and vehicle frame or between other parts being supported, and/or involve very complicated, expensive and space wasting constructions. There is a need for an improved load support vibration isolation mount which has enhanced energy absorbing ability in response to dynamic loading, which has a broader response to different frequencies of dynamic loading as compared with the aforementioned known mounts, and which at the same time is relatively simple and economical.

DISCLOSURE OF INVENTION

An object of the present invention is to provide an improved load support vibration isolation mount which solves the aforementioned problems of the prior art mounts. More particularly, an object of the invention is to provide an improved load support vibration isolation mount which has enhanced energy absorbing ability in response to dynamic loading and which has a relatively broad response characteristic for absorbing energy from dynamic loading of different frequencies, while at the same time being relatively simple and economical.

These and other objects are attained by the improved load support vibration isolation mount of the invention which comprises a first mount part securable to a first member, a second mount part securable to a second member, guide means for guiding relative movement of the first and second parts, first spring cushion means and high pressure fluid medium means disposed in series between the first and second mount parts to attenuate vibration induced force transfer between the first and second mount parts, and at least one porous elastic member disposed in the high pressure medium means for absorbing energy from dynamic loading of the mount. In addition to the shock or energy absorbing ability of the first spring cushion means of the mount during dynamic loading of the mount, the at least one porous elastic member in the high pressure fluid medium means also advantageously absorbs energy as it is compressed and as it allows the high pressure fluid medium means to flow into or out of the member with resistance in response to dynamic loading of the mount.

Illustratively, the at least one porous elastic member is a formed of porous silicone rubber. According to the disclosed, preferred embodiment of the load support vibration isolation mount of the invention, at least one sieve-like plate is provided adjacent the at least one porous elastic member with the plate and member being arranged in stacked relation such that the plate is movable against the member to compress the porous elastic member in response to dynamic loading of the mount.

The sieve-like plate has a plurality of through holes which extend in direction of force transfer between the first and second mount parts for allowing the high pressure fluid medium means to pass therethrough with resistance in response to dynamic loading of the mount. Illustratively, dynamic loading of the mount causes a pressure pulse or pulses to travel through the high pressure fluid medium means, which is a liquid, namely oil in the disclosed embodiment. This travelling pulse, causes the sieve-like plate to move in the direction of the pulse. As the plate moves the hydraulic fluid flows through the small holes in the plate. The resistance to this flow results in energy from the dynamic loading being absorbed during the movement of the plate. Further energy is absorbed as the moving plate compresses the adjacent porous elastic member because of the resilient nature of the member and the resistance to the flow of the hydraulic fluid out of the elastic member during its compression.

In the illustrated embodiment, the load support vibration isolation mount comprises a plurality of elastic, porous members and sieve-like plates arranged alternately in stacked relation within the high pressure fluid medium means. Means are provided for maintaining the alignment of the stacked members and plates within the mount. The alignment means includes a passage through each member and plate. The passages in the respective member end plates are aligned with one another, and a fastener extends therethrough for maintaining alignment of the members and the plates while permitting movement of plates and porous members relative to the fastener in a direction along the length of the fastener.

The first spring cushion means of the mount is preferably a pressurized gas. The gas cushion and the high pressure fluid medium means, e.g. the hydraulic fluid, are arranged in series in the mount. Means are provided for separating the gas cushion and the high pressure fluid medium means in the mount. In this illustrated embodiment this separating means is a flexible diaphragm of, for example, thin metal which divides the space within the mount to form respective pressure spaces for the gas and liquid. Other materials could also be used for the separating means depending on the pressures and loads which the mount must withstand. A freely movable piston sealed in the space could also be used to divide the space.

To further enhance the ability of the load support vibration isolation mount for responding to a wide range of induced vibration forces, frequencies and amplitudes, according to the present invention the high pressure fluid means of the mount is communicated with high pressure fluid means in an accumulator having a volume of high pressure fluid means which is substantially greater than the volume for the high pressure fluid means enclosed by the mount. Where a gas cushion is employed as the first spring cushion means, the gas in the mount can also be communicated with pressurized gas in an accumulator having a volume of pressurized gas which is substantially greater than the volume of gas within the mount. By continuously maintaining a predetermined, controllable fluid pressure and gas pressure in the respective accumulators, the vibration absorber mount, which is constantly in communication with the predetermined pressures in the respective accumulators, is effective as a vibration absorber which automatically accommodates for changes in the vibration force, amplitude and frequency over a wide range.

These and other objects, feature and advantages of the present invention will become apparent from the following description when taken in connection with the accompanying drawings which show, for purposes of illustration only, two embodiments of the invention.

BEST MODE FOR CARRYING OUT THE INVENTION

Figure 1:
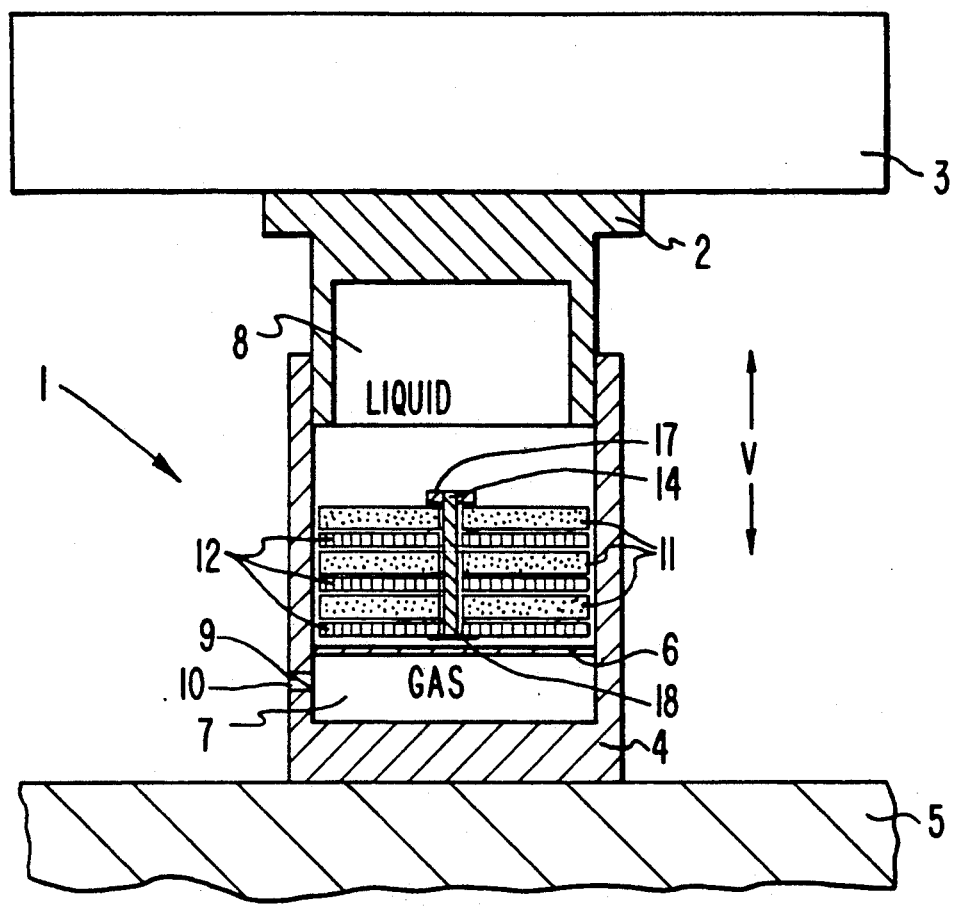
FIG. 1 is a cross-sectional view through a load support vibration isolation mount according to a first embodiment of the invention.
Figure 2:
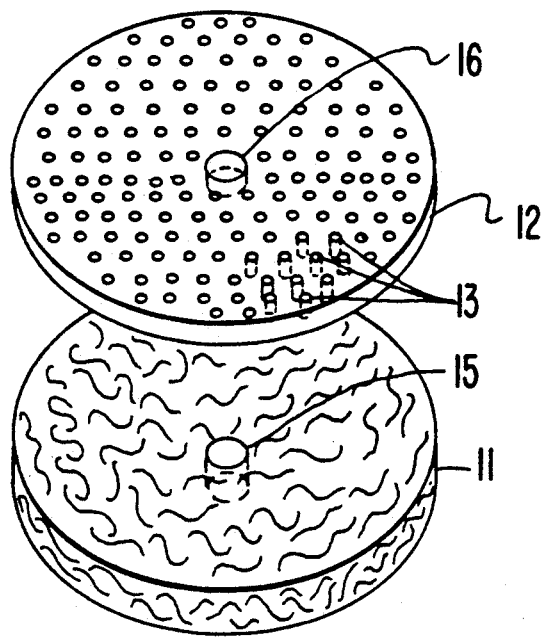
FIG. 2 is a perspective view of a porous elastic member and a sieve-like plate of the mount of FIG. 1 shown in disassembled, spaced relation.

Referring now to the drawings, a load support vibration isolation system mount 1 according to a first embodiment of the invention as depicted in FIGS. 1 and 2 comprises a first mount part 2 which is secured to a first member 3, for example a vehicle engine, electrical generator or other component to be supported. A second mount part 4 is secured to a second member 5 upon which the first member 3 is supported by way of the mount The second member 5 can be a vehicle frame, for example, in the case the first member 3 is a vehicle engine. The details of the connections between the first mount part and first member and between the second mount part and the second member are not illustrated in the application drawings but conventional mechanical fasteners, welding, or other joining techniques can be employed for this purpose as will be readily understood by the skilled artisan.

The cooperating ends of the first and second mount parts 2 and 4 are in form of open ended cylinders which are arranged in telescoping, fluid sealing relation for relative movement with respect to each other in the direction V in FIG. 1 to define a pressure space within the mount which is subdivided by a diaphragm 6.

In the illustrated embodiment, the diaphragm 6 is a thin, flexible metal sheet which is sealed at its outer edges as by welding to the inner cylindrical surface of second part 4. In relatively high pressure/high load applications, a metal plate can be used as the diaphragm. Alternatively, a piston with seal ring for sealing between the inner cylindrical surface and the piston, could be arranged for free movement within the part 4 to divide the pressure space. The diaphragm 6, metal plate or piston sealing divides the space within the mount 1 into a pressurized gas space 7 and a separate space 8 on the opposite side of the diaphragm, plate or piston for a hydraulic fluid.

A pressurized gas is introduced into the space 7 through an inlet 9 formed in the side wall of the second mount part 4. After introduction of the gas to the space 7, the inlet 9 is closed by means of a conventional threaded closure 10. The gas pressure within the closed space 7 can be relatively low, for example 20-30 psi, or substantially higher, depending upon the hydraulic fluid pressure to be present in the space 8, which latter is a function of the loads the mount is to support. That is, the gas pressure is selected to provide a desired shock absorbing characteristic for dynamic loading or vibration transmitted to the mount. The hydraulic fluid in space 8 above the diaphragm 6 is oil although other liquids could be employed.

The cylindrical, telescoping portions of the first and second mount parts 2 and 4 guide the respective mount parts for movement relative to one another in the direction in response to changes in a load applied to the mount by way of the first and/or second members 3 and 5. By way of example, in the illustrated embodiment the cylindrical portions of the first and second mount parts 2 and 4 which define the pressurized gas space 7 and hydraulic fluid space 8 have an inner diameter of approximately three inches. Therefore, if the mount 1 is to support a 700 pound load, for example, the pressure in the hydraulic fluid in space 8 will be approximately 100 psi. In this case, the gas pressure provided in the pressurized gas space 7 can be selected to be within the range of 50-120 psi, for example, so that shocks or dynamic loading from the vibration of a vehicle engine as the first member 3, for example, are absorbed at least in part by the gas cushion provided by the pressurized gas in space 7 acting against the compressed hydraulic fluid in space 8 by way of the flexible diaphragm 6 sealingly dividing the interior of the mount. Of course, the flexible diaphragm is subject to only limited movement, e.g. 2-4 mm, back and forth along a direction parallel to the V direction, with pressure fluctuations since its radially outer edges are connected to the inner surface of the cylindrical wall of the mount. Where a freely movable piston is used to divide the space in the mount, the piston would be able to move to maintain a pressure balance between the pressurized gas and pressurized liquid in the mount.

According to a further feature of the invention, the load support vibration isolation mount 1 of the invention comprises at least one porous elastic member 11 disposed in the hydraulic fluid in the space 8 for absorbing energy from dynamic loading of the mount. The porous elastic member 11 is preferably a porous sponge which can be formed of silicone rubber, for example. The hydraulic fluid permeates the porous elastic member and can flow into and out of the member as it is compressed during dynamic loading of the mount.

Further, according to the invention at least one sieve-like plate 12 is arranged adjacent the at least one porous elastic member 11. The sieve-like plate 12 has a plurality of small through holes therein which allow the hydraulic fluid to pass therethrough with resistance for absorbing energy in response to dynamic loading of the mount. The movement of the plate against a porous elastic member also serves to compress the elastic member.

As illustrated in FIG. 1, in the preferred embodiment a plurality of porous elastic members 11 and sieve-like plates 12 are arranged alternately in stacked relation within the hydraulic fluid of the mount immediately above the diaphragm 6. The stacked members and plates are maintained in alignment with one another by means of a fastener 14 which extends axially through the stacked members 11 and plates 12 in passages 15 and 16 formed in the members 11 and plates 12, respectively. One end of the fastener 14 is threaded and receives nut 17. The lower end of the fastener 14 is flanged at 18. The diameter of the passages 15 and 16 are slightly larger than the diameter of the fastener 14 to permit relative sliding motion of the members 11 and plates 12 with respect to the fastener between the flange 18 and nut 17 as during compression of the assembly upon dynamic loading of the mount.

The sieve-like plates 12 can be formed of plastic or a light metal, for example aluminum. The through holes 13 in each plate 12 are needle-like. Illustratively, a large number of the through holes 13 can be provided in each plate 12 as by drilling, with the holes each having a diameter of 1/5 mm, for example. The thickness of each plate 12 is ¼ inch in the illustrated embodiment but other thicknesses could be used. The small holes in the sieve-like plates 12 allow passage of the hydraulic fluid therethrough but offer resistance to this flow. As a result, the plate members 12 each act like a giant capillary in restricting flow. The thickness of the porous, cylindrical rubber members is one inch in the disclosed embodiment but other thickness could be employed. The members are highly porous, that is, they are full of the hydraulic fluid. The material of the members is elastic to permit temporary compression thereof during dynamic loading and return to their initial thickness upon cessation of the dynamic loading.

As noted above, dynamic loading in the form of vibration travelling through the hydraulic fluid in the space 8 results in axial motion of the members 11 and plates 12 through the compression of the elastic members 11 and the resistance to liquid flow offered by both the members 11 and plates 12. Thus, energy is absorbed by the assembly of the members 11 and plates 12 within the hydraulic fluid as the shock wave traverses the hydraulic fluid and impacts upon the diaphragm 6 where additional energy is absorbed by the pressurized gas cushion in space 7 beneath the diaphragm.

Figure 3:
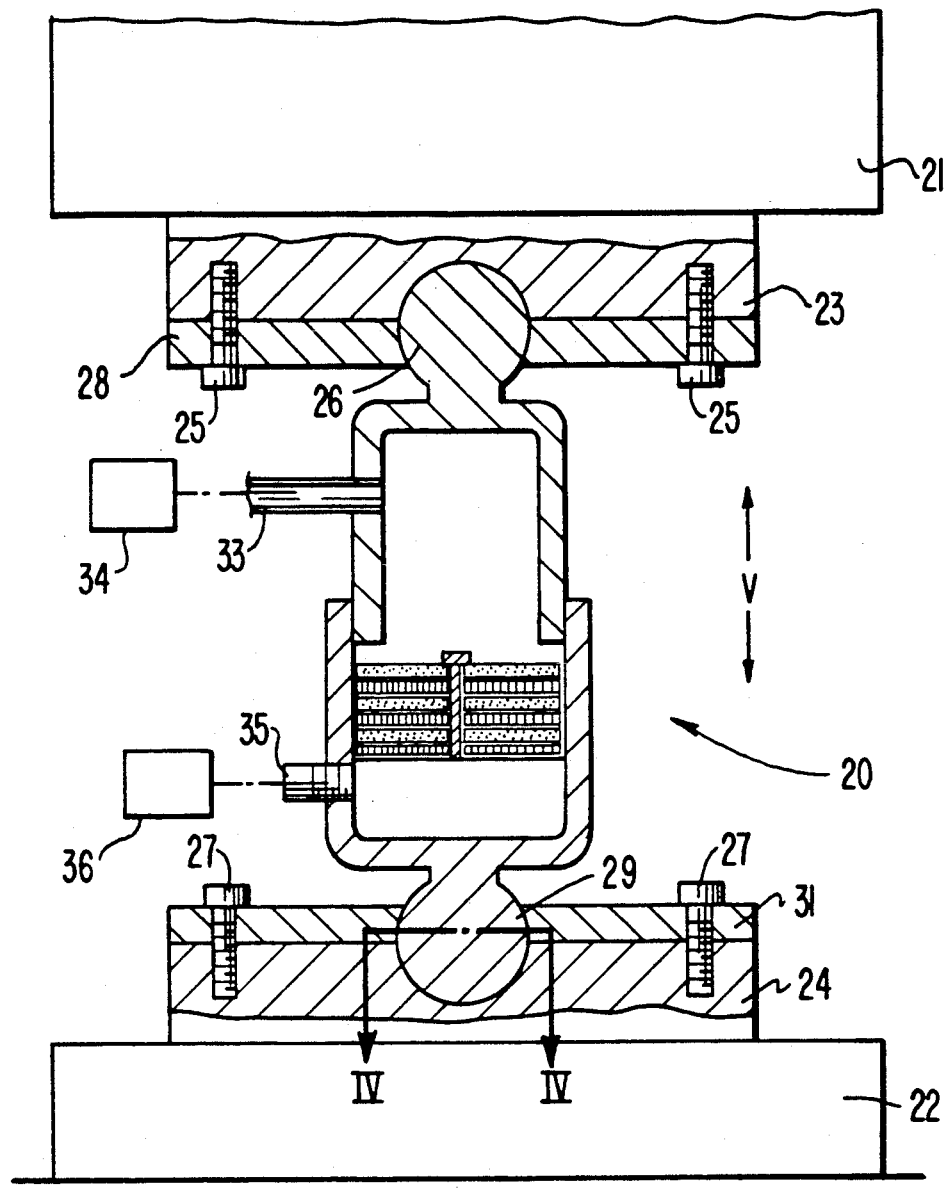
FIG. 3 is a cross-sectional view through a second embodiment of a load support vibration isolation mount of the invention which includes hydraulic fluid and gas pressure accumulators schematically illustrated in the figure.
Figure 4:
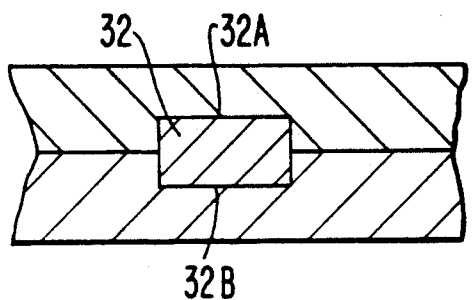
FIG. 4 is a schematic sectional view showing a detail of FIG. 3 taken along line IV—IV, but employing another form of construction than in the embodiment of FIG. 3.

In the embodiment of FIG. 3, the load support vibration isolation system mount 20 is shown connected between a vibrating part 21, such as a vehicle engine, generator unit, or helicopter blade drive assembly, and a support frame 22. The mount 20 is connected to the vibrating part 21 by way of a first mounting plate 23 fixed at the underside thereof as by welding, for example. A second mounting plate 24 is fixed to the relatively fixed support structure 22, such as the vehicle frame. A spherical joint member 26 is connected via bolts 25 and connecting plate 28 with the plate 23 so as to permit universal pivoting movement of the part 26 within the socket defined by the plates 23 and 28. In a similar manner, a second spherical joint member 29 is detachably attached by the bolts 27 and attaching plate 31 with the mounting plate 24. Due to the spherical ball joint connections by way of members 26 and 29, relative pivotable movements thereof are permitted with bearing guidance over the surface of the spherical ball joints. FIG. 4 schematically depicts an alternative form of the connection of the mount to the vibratory part and support frame wherein the spherical member 32 is cut away to form parallel guide surfaces 32A and 32B which are guided in corresponding guide surfaces at the mounting plates as in the embodiment of FIG. 3 so as to permit relative pivotable movement about one axis, while preventing pivotal movement about any other axis. This guided control of the relative pivotable movement can be advantageously applied in certain vehicle mounts to limit engine movements in the direction of its crankshaft axis.

The construction of the mount 20 in FIG. 3, aside from the connections to the vibratory part 21 and support frame 22 as discussed above, is similar to that illustrated in the embodiment of FIGS. 1 and 2 except that the hydraulic fluid in the space 8 above the diaphragm 6 is in constant communication by way of pressure line 33 with an accumulator 34 containing hydraulic fluid at a predetermined, controlled pressure. A pressure line 35 also communicates the pressurized gas in the space 7 below the diaphragm 6 with an accumulator 36 containing pressurized gas in a predetermined, controlled pressure. The pressures in the respective accumulators 34 and 36 are maintained through the use of respective pumps and pressure sensors, not shown, to predetermined pressures. Reference is made to applicant's pending U.S. patent application Ser. No. 07/414,254 filed Sept. 29, 1989, the disclosure which is hereby incorporated by reference. By connecting the limited pressure spaces in the mount 20 with the hydraulic fluid and gas in the respective accumulators, it is possible to restore and maintain the respective pressures in the mount in a rapid and reliable manner for optimizing the response characteristics of the load support vibration isolation mount. The shock absorbing ability of the mount 20 is also enhanced by the alternately stacked porous elastic members 11 and sieve-like plates 12 located within the mount as in the embodiment of FIGS. 1 and 2.

While I have shown as described only two embodiments in accordance with the present invention, it is understood that the same is not limited thereto, but is suspectable to numerous changes and modifications as known to those skilled in the art. For example, the shape of the mount is not limited to cylindrical but could have another form. Likewise, the size of the mount is dependent upon the static load which the mount must carry and also the expected fluctuation of this loading as a result of dynamic loading such as vibration. Therefore, I do not wish to be limited to the details shown and described herein, but intend to cover all such changes and modifications as are encompassed by the scope of the appended claims.

I claim:

1. A load support vibration isolation mount comprising a first mount part securable to a first member, a second mount part securable to a second member, guide means for guiding relative movement of the first and second parts, first spring cushion means and high pressure fluid medium means disposed in series between the first and second mount parts to attenuate vibration inducted force transfer between the first and second mount parts, and at least one elastic sponge member disposed in the high pressure fluid medium means, said at least one elastic sponge member being highly porous such that it is full of the high pressure fluid medium means which can flow into and out of the sponge member as it is compressed during dynamic loading of the mount for absorbing energy from dynamic loading of the mount.

2. The load support vibration isolation mount according to claim 1, wherein said porous sponge member is formed of silicone rubber.

3. The load support vibration isolation mount according to claim 1, wherein the high pressure fluid means of the mount is communicated with high pressure fluid means of an accumulator having a volume of high pressure fluid means which is substantially greater than the volume of a pressure space for the high pressure fluid means enclosed by the mount.

4. The load support vibration isolation mount according to claim 1, wherein said guide means includes means for permitting universal pivotal movement of the mount with respect to at least one of the first and second members.

5. The load support vibration isolation mount according to claim 4, wherein said guide means includes spherical ball joint connection means for at least one of the first and second mount parts.

6. The load support vibration isolation mount according to claim 1, wherein said guide means includes slidably interengagable cylinder walls of the first and second mount parts, said cylinder walls enclosing a pressure space for the high pressure fluid medium means.

7. The load support vibration isolation mount according to claim 1, wherein the first spring cushion means is a gas cushion.

8. The load support vibration isolation mount according to claim 7, wherein means are provided for separating the gas cushion and the high pressure fluid medium means in the mount.

9. The load support vibration isolation mount according to claim 8, wherein the separating means is a flexible diaphragm.

10. The load support vibration isolation mount according to claim 7, wherein the gas cushion is communicated with a pressurized gas in an accumulator whose pressurized gas volume is substantially greater than volume of the pressurized gas in the mount.

11. A load support vibration isolation mount comprising a first mount part securable to a first member, a second mount part securable to a second member, guide means for guiding relative movement of the first and second parts, first spring cushion means and high pressure fluid medium means disposed in series between the first and second mount parts to attenuate vibration inducted force transfer between the first and second mount parts, and a plurality of porous elastic sponge members and plates having a plurality of throughholes are disposed in the high pressure fluid medium means and arranged alternatively in stacked relation for absorbing energy from dynamic loading of the mount.

12. The load support vibration isolation mount according to claim 11 further comprising means for maintaining alignment of the stacked porous elastic sponge members and plates within the mount.

13. The load support vibration isolation mount according to claim 12, wherein the alignment means includes a passage through each porous elastic sponge member and plate, the respective passages being aligned with one another, and a fastener extending through the passages for maintaining alignment of the sponge members and the plates.

14. The load support vibration isolation mount according to claim 11, wherein the at least one plate is movable against the at least one porous elastic sponge member to compress the elastic sponge member in response to dynamic loading of the mount.

15. A load support vibration isolation mount comprising a first mount part securable to a first member, a second mount part securable to a second member, guide means for guiding relative movement of the first and second parts, first spring cushion means and high pressure hydraulic fluid disposed in series between the first and second mount parts to attenuate vibration induced force transfer between the first and second mount parts, and at least one highly porous elastic sponge member and at least one plate having a plurality of through holes which allow the high pressure hydraulic fluid to pass therethrough with resistance for absorbing energy in response to dynamic loading of the mount, said at least one porous elastic sponge member and said at least one plate being arranged in stacked relation in the high pressure hydraulic fluid for absorbing energy from dynamic loading of the mount.

* * * * *